(12) United States Patent
Hague et al.

(10) Patent No.: US 6,173,851 B1
(45) Date of Patent: Jan. 16, 2001

(54) METHOD AND APPARATUS FOR THE INTERIM STORAGE OF MEDICATED ORAL DOSAGE FORMS

(75) Inventors: Brian Hague; Steve Shoemaker, both of Salt Lake City, UT (US)

(73) Assignee: Anesta Corporation, Salt Lake City, UT (US)

( * ) Notice: Under 35 U.S.C. 154(b), the term of this patent shall be extended for 0 days.

(21) Appl. No.: 09/271,764

(22) Filed: Mar. 18, 1999

(51) Int. Cl.[7] .............................. B65D 50/00; A61J 7/00
(52) U.S. Cl. .................. 215/201; 215/231; 215/311; 220/229; 206/370; 604/1; 424/435; 424/439
(58) Field of Search ................... 215/274, 276, 215/201, 206, 224, 225, 228, 229, 231, 310, 311; 220/229; 206/210, 370, 366, 361, 15.2, 15.3, 363; 604/1, 77; 424/435, 440, 439, 441; 401/122; 15/257.05, 257.075

(56) References Cited

U.S. PATENT DOCUMENTS

| | | |
|---|---|---|
| 1,580,104 | 4/1926 | Hasselmann . |
| 2,436,291 | 2/1948 | Daniel . |
| 3,899,100 | 8/1975 | Rigaud . |
| 3,907,145 * | 9/1975 | Horvath ............................ 215/206 |
| 4,116,329 | 9/1978 | Garden . |
| 4,141,461 | 2/1979 | LaChance . |
| 4,340,148 | 7/1982 | Beckham . |
| 4,454,944 | 6/1984 | Shillington et al. . |
| 4,502,606 | 3/1985 | Shillington et al. . |
| 4,519,513 | 5/1985 | Weiler et al. . |
| 4,600,112 | 7/1986 | Shillington et al. . |
| 4,789,639 * | 12/1988 | Fleming ............................ 206/361 |
| 4,803,998 * | 2/1989 | Kezes et al. ........................ 604/1 |
| 5,024,327 | 6/1991 | Shillington . |
| 5,064,083 | 11/1991 | Alexander et al. . |
| 5,071,017 | 12/1991 | Stull . |
| 5,111,946 | 5/1992 | Glanz . |
| 5,183,156 | 2/1993 | Bruno . |
| 5,223,259 * | 6/1993 | Lackney ............................ 604/77 |
| 5,245,117 | 9/1993 | Withers et al. . |
| 5,259,501 | 11/1993 | Withers et al. . |
| 5,447,247 | 9/1995 | Derksen . |
| 5,511,654 * | 4/1996 | de la Rocha ...................... 206/210 |

\* cited by examiner

Primary Examiner—Nathan J. Newhouse
(74) Attorney, Agent, or Firm—Kirton & McConkie; Michael F. Krieger

(57) ABSTRACT

An apparatus for the reusable interim storage of partially consumed medicated oral dosage forms and methods for employing such an apparatus in order to use medicated oral dosage forms in the safest possible manner. The apparatus of the present invention in its broadest terms comprises (1) a container sized to hold a medicated oral dosage form, (2) means for allowing a medicated oral dosage form easy access into the container but substantially preventing the medicated oral dosage form from passing out of the container, and (3) a child resistant means for allowing an adult to remove a medicated oral dosage form from within the container despite the one-way access means. The preferred embodiment comprises an opaque container having one opening, a child resistant closure with an aperture there through that extends over said opening, and a plastic slitted membrane covering said aperture. The method of the present invention comprises providing a patient with the apparatus of the present invention, administering to the patient a medicated oral dosage form, and when the patient has received sufficient medication, inserting the partially consumed medicated oral dosage form into the apparatus via the one-way access means.

18 Claims, 3 Drawing Sheets

METHOD AND APPARATUS FOR THE INTERIM STORAGE OF MEDICATED ORAL DOSAGE FORMS

BACKGROUND OF THE INVENTION

1. The Field of the Invention

This invention relates to childproof containers and in particular to childproof containers for the interim storage of medicated oral dosage forms.

2. Description of the Prior Art

A large number of chronically ill patients, many of whom are convalescing at home, have been prescribed opioids for the pain associated with their disease. These opioids ease most of these patients' pain, but opioid levels cannot safely be raised to account for the phenomenon of "breakthrough pain." U.S. Pat. No. 4,671,953 discloses a method for treating such breakthrough pain by administering a medicated oral dosage form, containing a strong drug such as fentanyl, in a dose-to-effect manner to such patients. Such a method has been shown to be effective in treating breakthrough pain. The method is also effective in treating post-surgical or other types of pain. A patient inserts the medicated oral dosage form into his or her mouth, and in only a few minutes, the effects of the fentanyl can be felt, relieving the breakthrough pain. Such a patient may become drowsy. Because the medicated oral dosage form may not have been fully consumed and the patient may not be able to dispose of it by rinsing under tap water, there are concerns that a child in the home, for example, will see the partially consumed medicated oral dosage form and will put it into his or her mouth.

Accordingly, what is needed in the art to calm such concerns is a container for a patient to store such a partially consumed medicated oral dosage form in such a way as to prevent a child from further consuming it. Preferably, the patient could then dispose of the remainder of the medicated oral dosage form properly at a later time, and could continue to use and reuse the container until the medicated oral dosage form is properly disposed of.

There are a variety of child resistant containers. For example, most drugs dispensed or sold over the counter today are placed in containers with child resistant closures. One such closure screws onto a container in a conventional manner, but cannot be removed simply by unscrewing it. Instead, it must be unlocked by applying sufficient force normal to the closure and can then be removed by simultaneously turning it. In another version, the closure is pressed onto the container, where it remains by friction fit. The closure can be popped off the container with sufficient force, but only if it is oriented in a predetermined direction. The correct orientation is usually obtained by lining up marks on both the container and the closure.

However, as has been noted by others, many child resistant containers are difficult for even some adults to open. For example, the elderly or infirm may find it difficult to exert sufficient force normal to a closure to unlock it, or may simply find it too arduous to grasp a closure to pop it or to turn it open. For many of these same reasons, conventional child resistant containers are not suited to the interim storage of partially consumed medicated oral dosage forms. A patient using a medicated oral dosage form to relieve breakthrough pain, for example, may be too drowsy or otherwise unable to exert sufficient force normal to a closure to unlock it or even to pop or turn it open. Such a patient could not open such a container and then reclose it to safely store a partially consumed medicated oral dosage form. The process of opening and reclosing such a container could very well be too arduous or simply impossible for a patient under the effects of such medication. Although another adult could perform this task for the patient, it is not feasible, financially or logistically, for a nurse or other such adult to be present every time pain occurs and/or every time a patient uses a medicated oral dosage form. Thus, a more easily accessible, yet effective child resistant container is needed.

SUMMARY OF THE INVENTION

The apparatus of the present invention in its broadest terms comprises (1) a container sized to hold a medicated oral dosage form, (2) means for allowing a medicated oral dosage form one-way access into the container in a relatively easy manner while still preventing the medicated oral dosage form from passing out of the container (one-way access means), and (3) child resistant means for allowing an adult to remove a medicated oral dosage form from within the container despite the one-way access means. This allows the user to bypass the one-way access limitations in accessing the interior of the container to properly dispose of partially consumed units. There are several embodiments of this invention.

The method of the present invention comprises using such an apparatus for the interim storage of medicated oral dosage forms so as to be able to use medicated oral dosage forms in the safest manner possible. The partially consumed oral dosage form is slid through the one-way access means into the container. An adult may subsequently remove the medicated oral dosage form at a convenient time, or the patient may do so after the effect of the medication has sufficiently subsided. The medicated oral dosage form may then be disposed of in a permanent fashion.

The container of the apparatus can be any suitable container of sufficient size to contain a medicated oral dosage form. It will be appreciated that the term "oral dosage form" as used herein includes tablets, lozenges, patches, pastilles and other oral dosage forms with holders and that these dosage forms may be dissolvable or nondissolvable. In one embodiment, the container is made of plastic and is opaque so that a child cannot see the contents of the container. In still another embodiment, the container may be cut with one or more elongated slots (or other openings of suitable size and shape) to allow the container's interior to be more easily flushed with running water.

One suitable one-way access means comprises (1) a flat or concave plastic membrane with slits extending radially outward from a central point in combination with (2) an opening formed in the container, the membrane covering or otherwise regulating access to the opening. The slits define segments in the plastic membrane and are of sufficient length to allow a medicated oral dosage form to pass through an opening in the membrane that is created when the medicated oral dosage form is pressed against and bends the segments. Thus, the plastic is of sufficient stiffness that some force is required to bend the pie-shaped segments. When the force is discontinued, the pie shaped slits return to their original position, closing the opening in the membrane. Because a medicated oral dosage form cannot pass back through the slitted membrane without the application of force, and because sufficient force is not available to press a medicated oral dosage form against the membrane from within the container, the slitted membrane substantially prevents the medicated oral dosage form from passing out of the container. It will be appreciated that a number of other slit patterns may be used. In one embodiment, the slits are radially extending arcuate slits.

One suitable childproof bypass means comprises (1) a child resistant closure and (2) an opening in the container covered by the closure. After a patient has inserted a medicated oral dosage form through the one-way access means, he or she may then later remove the child resistant closure and retrieve the medicated oral dosage form through the opening. In one embodiment of the invention, there are two openings in the container, one for the one-way access means and another for the child resistant bypass means. As stated above, removal of the closure allows for access to the interior of the container and removal and reuse of the medicated oral dosage form.

In the preferred embodiment, however, there is just one opening in the container, used to provide access for both the one-way access means and the child resistant bypass means. In that embodiment, the child resistant bypass means comprises (1) a child resistant closure and (2) an opening in the container covered by the closure. The one-way access means comprises (1) the same opening in the container, (2) an aperture formed through the closure and allowing access through the opening in the container, and (3) a plastic slitted membrane that covers the aperture and thereby regulates access through it and the opening. Thus, a patient can insert a partially consumed medicated oral dosage form through the membrane (and thereby through the aperture and the opening into the container) and can then later remove the medicated oral dosage form through the opening by removing the child resistant closure. In both insertion and removal, the medicated oral dosage form passes through the same opening in the container.

Other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

As stated above, the apparatus of the present invention in its broadest terms comprises (1) a container sized to hold a medicated oral dosage form, (2) means for allowing a medicated oral dosage form one-way access into the container in a relatively easy manner, but preventing the medicated oral dosage form from passing out of the container, and (3) child resistant means for allowing an adult to remove a medicated oral dosage form from within the container despite the one-way access means. There are several embodiments of this invention.

Figure 1:
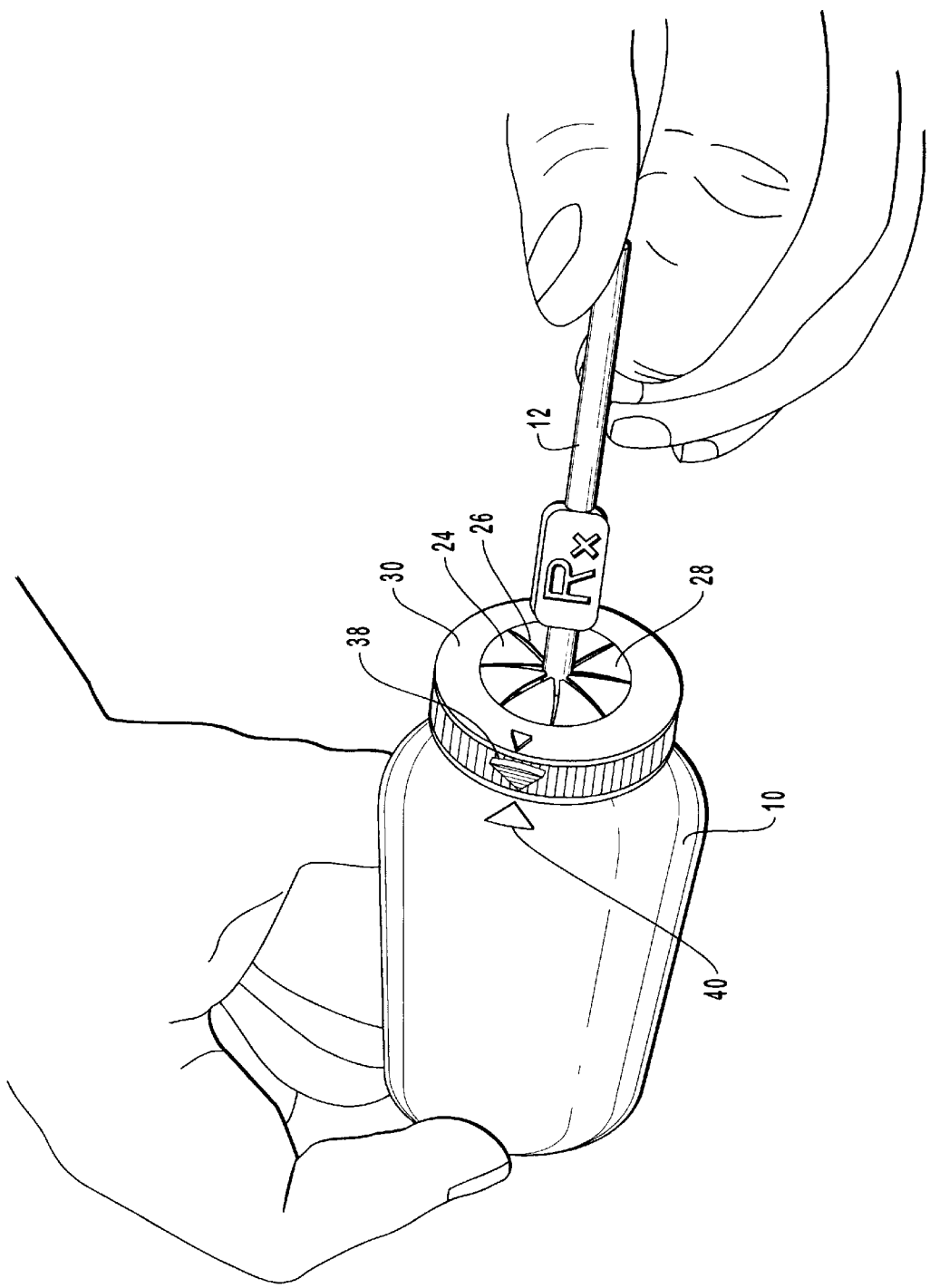
FIG. 1 is a perspective view of a medicated oral dosage form partially inserted into an interim storage container in accordance with one embodiment of the present invention.

In the embodiment pictured in FIG. 1, the container is an opaque bottle 10 made of high density polyethylene or other suitable material. Bottle 10 is substantially cylindrical, having a height of approximately six inches, and a diameter of approximately one-and-a-half inches. Of course, the exact size and shape of the container is not important. What is critical is that bottle 10 is of sufficient size so as to be able to receive a medicated oral dosage form 12 completely within its interior. Of course, medicated oral dosage forms like medicated oral dosage form 12 may be manufactured in various sizes and shapes. Bottle 10 cannot be used with a medicated oral dosage form whose size does not allow it to be completely received within the interior of bottle 10. The fact that bottle 10 is opaque provides a significant advantage in that it prevents children from seeing medicated oral dosage form 12 when it is being held within bottle 10. A transparent bottle may be used for the container of the present invention, but this does not provide the additional advantage of preventing children from seeing medicated oral dosage form 12 when it is held within bottle 10.

Formed at the top of bottle 10 is an opening 14 (shown in FIG. 2), allowing relatively easy access from outside bottle 10 into its interior. Opening 14 is approximately one-and-a-quarter inches in diameter. What is critical is that opening 14 be of sufficient size to allow medicated oral dosage form 12 to enter and to exit bottle 10 through opening 14. Of course, bottle 10 cannot be used for any medicated oral dosage forms whose size or configuration does not allow them to pass through opening 14 into bottle 10.

Figure 2:
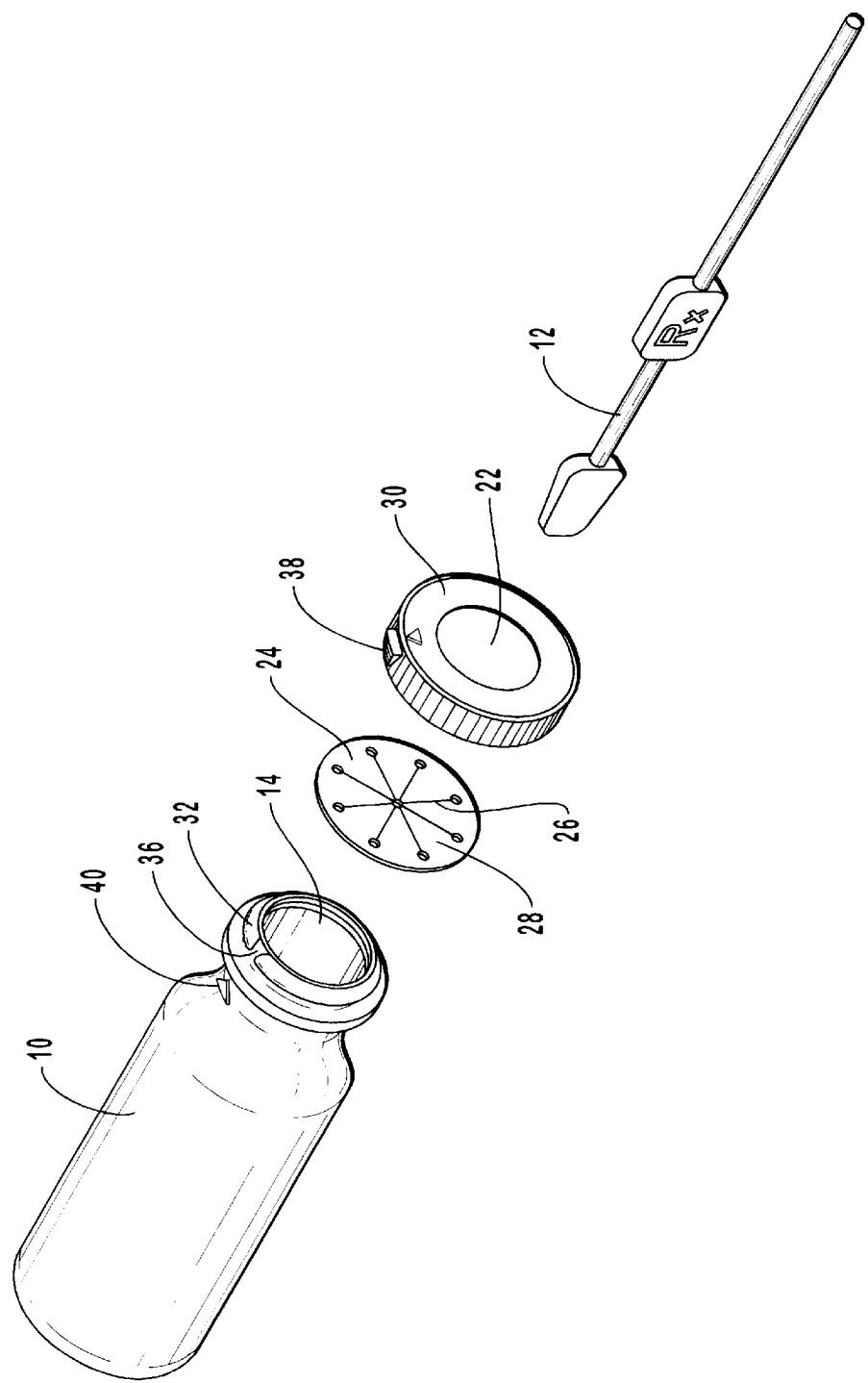
FIG. 2 is an exploded perspective view of the closure and plastic membrane combination used in the interim storage container of FIG. 1.

Secured to the top of bottle 10 and extending over opening 14 is child resistant closure 30. Closure 30 is a well known "child resistant" closure. As seen in FIG. 2, formed on bottle 10 around opening 14 is a lip 32. Lip 32 is of such a size that when pressed downward onto bottle 10, closure 30 "pops" over lip 32 and remains there by friction fit between closure 30 and lip 32. Lip 32 extends around the circumference of bottle 10 at opening 14, except at one lipless location 36. Closure 30 contains a closure marker 38 on the outer circumference of closure 30 and a tab (not shown) located on the inner circumference of closure 30 directly opposite closure marker 38 and extending radially inwardly. A bottle marker 40 appears on bottle 10 directly below lipless location 36. After closure 30 is secured on bottle 10, closure 30 cannot be removed unless the tab is aligned with lipless location 36. When closure 30 is so aligned, closure 30 can be removed by "popping" closure 30 off lip 32, i.e., by applying a force tending to separate closure 30 from bottle 10. When closure 30 is not so aligned, the tab catches on lip 32, preventing closure 30 from being removed from bottle 10. However, when closure 30 is on bottle 10, neither the tab, lip 32, nor lipless location 36 can be seen. As a result, closure marker 38 and bottle marker 40, which can be seen, must be used to align the tab with lipless location 36. When closure marker 38 is aligned with bottle marker 40, the tab is also aligned with lipless location 36.

When closure 30 is removed from bottle 10, access is had to the interior of bottle 10 via opening 14. After medicated oral dosage form 12 has been inserted into bottle 10, medicated oral dosage form 12 can be removed from bottle 10 only by unlocking and removing closure 30.

Figure 3:
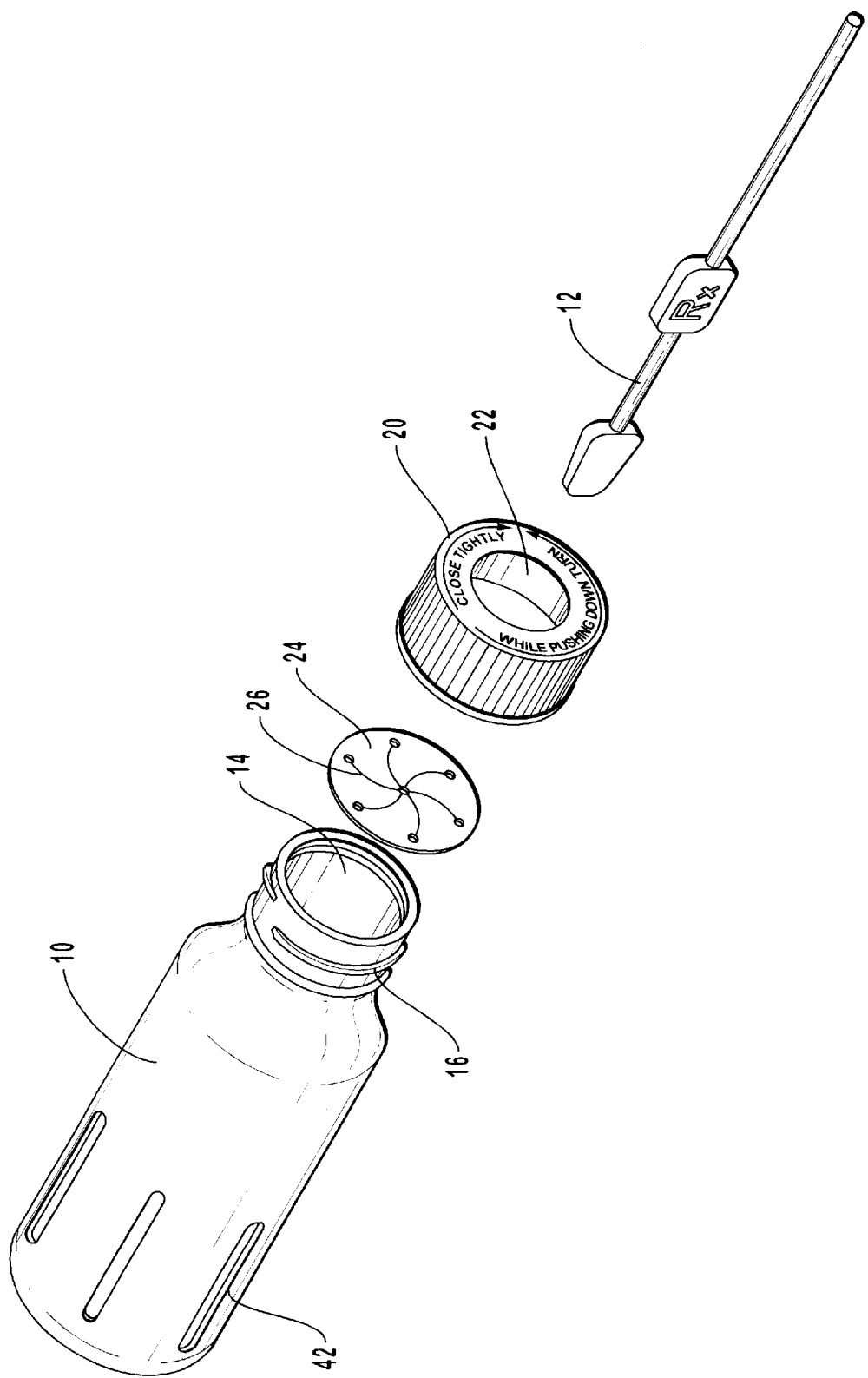
FIG. 3 is an exploded perspective view of an embodiment employing an alternative of closure, plastic membrane, and container to that used in the interim storage container of FIGS. 1 and 2.

FIG. 3 illustrates the use of another common type of child resistant closure 30 within the scope of the present invention. Like closure 30, closure 20 extends over opening 14 of bottle 10, but is secured there by threads 16 formed on bottle 10 around opening 14. Threads 16 mate with some threads (not shown) formed around the inside circumference of closure 20 to allow closure 20 to screw onto and off of bottle 10. Closure 20 is locked on bottle 10 and can be unlocked and removed only by applying sufficient force normal to closure 20 towards bottle 10 and by simultaneously turning closure 20 in a specified (usually counterclockwise) direction. If closure 20 is turned counterclockwise without applying a downward force normal to closure 20, closure 20 turns, but does not screw off of bottle 10. The structure and method of operation for such closures is well known.

Almost any of the other well-known child resistant closures is suitable for use with the present invention. Although such closures are not entirely "child resistant" in the sense that many older (and some younger) children have learned how to remove them, the term is used to refer to closures that generally prevent young children from removing such closures or that otherwise incorporate means to make a closure more difficult to remove. Similarly, the term "adult" is used in this specification to refer to anyone who can operate a "child resistant closure" without much difficulty.

In FIGS. 2–3, it can be seen that formed through either closure 20 or closure 30 is an aperture 22. Aperture 22 is of sufficient size that medicated oral dosage form 12 can pass through it. A plastic slitted membrane 24 covers aperture 22. Thus, when closure 20 or closure 30 is placed on bottle 10 over opening 14, membrane 24 regulates access to the interior of bottle 10 through opening 14.

As seen in FIGS. 2 and 3, membrane 24 is a circular piece of slitted plastic fitted within closure 20 or closure 30 over aperture 22. In FIGS. 2 and 3, membrane 24 is also sized so as to fit snugly within closure 20 or closure 30. As an alternative, membrane 24 can be mounted with adhesive or otherwise fastened over aperture 22. In addition, membrane 24 can be manufactured as an integral, unitary part of closure 20 or closure 30.

Membrane 24 can take a variety of forms and configurations. FIGS. 1 and 2 show membrane 24 with straight slits 26 extending radially outward from a central point. The slits define pie-shaped segments 28 in membrane 24 and are of sufficient length to allow medicated oral dosage form 12 to pass through an opening in membrane 24 that is created when medicated oral dosage form 12 is pressed against and bends pie-shaped segments 28. Thus, the plastic is of sufficient stiffness that some force is required to bend pie-shaped segments 28, but not so much force that inserting medicated oral dosage form 12 through membrane 24 and aperture 22 becomes difficult. When the force is discontinued, pie shaped segments 28 return to their original position, closing the opening in membrane 24. Because medicated oral dosage form 12 cannot pass back through slitted membrane 24 without the application of force, and because the only potential force available to press medicated oral dosage form 12 against membrane 24 within bottle 10 is its own weight, slitted membrane 24 substantially prevents medicated oral dosage form 12 from passing out of bottle 10.

A number of other slit patterns may be used. For example, FIG. 3 shows arcuate slits 26. In addition, membrane 24 need not be flat. For example, the center portion of membrane 24 can be conical, with the apex pointing down into bottle 10. This configuration makes it even more difficult to remove medicated oral dosage form 12 through aperture 22 after medicated oral dosage form 12 has been inserted into bottle 10. The slits may end with a periphery, to prevent the slits from tearing to the membrane edge.

It should be emphasized that FIGS. 1–3 illustrate only some embodiments of the invention. As stated above, the apparatus of the present invention in its broadest terms comprises (1) a container sized to hold a medicated oral dosage form, (2) means for allowing a medicated oral dosage form relatively easy one-way access into the container, but substantially preventing the medicated oral dosage form from passing out of the container, and (3) child resistant means for allowing an adult to remove a medicated oral dosage form from within the container despite the one-way access means.

In the embodiments disclosed in FIGS. 1–3, the one-way access means comprises (1) slitted membrane 24, (2) opening 14, and (3) aperture 22, wherein membrane 24 covers (and thereby regulates access through) aperture 22. By regulating access through aperture 22, the slitted membrane also regulates access through opening 14. The child resistant bypass means comprises (1) closure 20 or closure 30, and (2) opening 14, wherein closure 20 or closure 30 extends over opening 14. Thus, a patient can relatively easily insert a partially consumed medicated oral dosage form through the membrane (and thereby through the aperture and the opening into the container) and can then later remove the medicated oral dosage form through the opening by removing the child resistant closure. In both insertion and removal, the medicated oral dosage form passes through the same opening in the container.

It will be appreciated that other embodiments for the one-way access means and child restraining means exist. For example, the one-way access means can comprise any of a variety of slitted membranes covering (and thereby regulating access to) a first opening in a container, and the child restraining means can comprise any of a variety of child resistant closures configured to regulate access to a second opening in the container. Any type of device that can perform the function of allowing a medicated oral dosage form easy access into the container, but substantially prevent the medicated oral dosage form from passing out of the container should be considered an "equivalent" of the disclosed slitted membranes and openings or apertures. For example, a maze-like, tortuous entry path may perform that function and, if so, should be considered an "equivalent." Moreover, any type of device that can perform the function of allowing an adult to remove a medicated oral dosage form from within the container despite the one-way access means should be considered an "equivalent" of the disclosed child resistant closures and openings. There is invention not just in providing new means for carrying out these functions, but also in the combination of these elements into one whole.

The unique features of the apparatus make it especially suited for the safest use of medicated oral dosage forms. This method comprises the steps of providing to a patient any of the interim storage containers described above; administering a medicated oral dosage form to the patient; and when the patient has received sufficient medication, inserting the partially consumed medicated oral dosage form into the interim storage container. Thereafter, when the patient is able, he or she (or another adult) may remove the partially consumed medicated oral dosage form for permanent disposal.

One alternative which provides for more permanent storage and disposal is to provide a patient with a storage container that does not allow access to anyone, adult or child, to a medicated oral dosage form after it has been inserted into the container. It should be noted that such a container is not an "interim" nor a "reusable" container, but it does provide for safe use of medicated oral dosage forms.

After the medicated oral dosage form has been removed for permanent disposal, the container can be reused. To facilitate reuse, one embodiment of the container is designed to allow it to be washed. This can be further facilitated by placing elongated slots 42 in the sides of the container, as illustrated in FIG. 3.

Thus, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. An interim storage system for medicated oral dosage forms, comprising:
   a) a container;
   b) means for controlling access, said means for controlling access allowing a medicated oral dosage form easy one way access into said container, but substantially preventing the medicated oral dosage form from passing through said means for controlling access thereafter out of said container; and
   c) childproof means for permitting an adult to remove a medicated oral dosage form from within said container despite said means for controlling access.

2. An interim storage container for medicated oral dosage forms as in claim 1, wherein said means for controlling access comprises:
   a) a plastic membrane with slits extending radially outward from a central point, and
   b) an opening formed in said container, access to said opening being regulated by said membrane.

3. An interim storage container for medicated oral dosage forms as in claim 1, wherein said childproof means comprises:
   a) a childproof lid; and
   b) an opening formed in said container, said lid extending over said opening.

4. An interim storage container for medicated oral dosage forms as recited in claim 1, wherein:
   a) said childproof means comprises:
      i) a childproof lid, and an opening formed in said container, said lid extending over said opening; and
   b) said means for allowing access comprises:
      i) a plastic membrane with slits extending radially from a central point, and
      ii) an aperture formed through said lid, said membrane regulating access through said aperture and said opening.

5. An interim storage container for medicated oral dosage forms, comprising:
   a) a container having an interior of sufficient size to hold a medicated oral dosage form within the interior, said container having an opening of sufficient size to permit easy access of a medicated oral dosage form into or out of the interior;
   b) a removable lockable lid attached to said container, said lid extending over the opening of said container, said lid having an aperture therethrough, said aperture being of sufficient size to permit access of a medicated oral dosage form into the interior of said container; and
   c) a one-way closure covering said aperture, said closure being capable of permitting a medicated oral dosage form to easily pass through the aperture into the interior of the container and being capable of substantially preventing the medicated oral dosage form from passing back from the interior of the container through the aperture once the medicated oral dosage form has completely passed through the closure, whereby after a medicated oral dosage form has been inserted through said aperture, said lid may be unlocked and removed from said container in order to remove said medicated oral dosage form through said opening from the interior of the container.

6. An interim storage container for medicated oral dosage forms as in claim 5, wherein said container is opaque.

7. An interim storage container for medicated oral dosage forms as in claim 5, wherein said opening is of such dimensions as to allow liquid water to have access to said interior, whereby said interior can be washed by said water.

8. An interim storage container for medicated oral dosage forms as in claim 7, wherein which one is an uncovered elongated slot.

9. An interim storage container for medicated oral dosage forms as in claim 5, wherein said one-way closure comprises a plastic membrane with slits.

10. An interim storage container for medicated oral dosage forms as in claim 9, wherein said slits extend radially outward from substantially a single point.

11. An interim storage container for medicated oral dosage forms as in claim 10, wherein said slits are arcuate.

12. An interim storage container for medicated oral dosage forms as in claim 5, wherein said lid can be unlocked by applying sufficient force normal to said lid and can be removed by simultaneously turning said lid.

13. An interim storage container for medicated oral dosage forms as in claim 5, wherein said lid can be unlocked by orienting it in a predetermined direction and can be removed thereafter by applying a force tending to separate said lid from said container.

14. A method of safely using medicated oral dosage forms, comprising the steps of:
   a) providing to a patient a storage container comprising:
      i) a container; and
      ii) means for allowing a medicated oral dosage form easy one way access into said container but substantially preventing the medicated oral dosage form from passing thereafter out of said container;
   b) administering a medicated oral dosage form to the patient; and
   c) when the patient has received sufficient medication, inserting the partially consumed medicated oral dosage form into said container via said means for allowing.

15. A method of safely using medicated oral dosage forms as in claim 14, wherein said storage container further comprises childproof means for permitting an adult to remove a medicated oral dosage form from within said container despite said means for allowing, and said method further comprises the step of having an adult remove said partially consumed medicated oral dosage form via said childproof means.

16. A method of safely using medicated oral dosage forms as in claim 15, wherein said adult is said patient.

17. A method of safely using medicated oral dosage forms as in claim 15, further comprising the step of administering said partially consumed medicated oral dosage form to said patient.

18. A method of safely using medicated oral dosage forms as in claim 14, further comprising the steps of:
   a) having an adult remove said partially consumed medicated oral dosage form via said childproof means;
   b) administering said partially consumed medicated oral dosage form to said patient;
   c) when the patient has received sufficient medication, inserting the partially consumed medicated oral dosage form into said container via said means for controlling.

* * * * *